United States Patent
Gries

(10) Patent No.: US 11,292,748 B2
(45) Date of Patent: Apr. 5, 2022

(54) ZIRCONIUM OXIDE POWDER FOR THERMAL SPRAYING

(71) Applicant: HÖGANÄS GERMANY GMBH, Goslar (DE)

(72) Inventor: Benno Gries, Wolfenbüttel (DE)

(73) Assignee: HÖGANÄS GERMANY GMBH, Goslar (DE)

(*) Notice: Subject to any disclaimer, the term of this patent is extended or adjusted under 35 U.S.C. 154(b) by 0 days.

(21) Appl. No.: 16/624,590

(22) PCT Filed: Jun. 21, 2018

(86) PCT No.: PCT/EP2018/066562
§ 371 (c)(1),
(2) Date: Dec. 19, 2019

(87) PCT Pub. No.: WO2018/234437
PCT Pub. Date: Dec. 27, 2018

(65) Prior Publication Data
US 2020/0123060 A1    Apr. 23, 2020

(30) Foreign Application Priority Data

Jun. 21, 2017  (DE) .................... 10 2017 005 800.8

(51) Int. Cl.
*C04B 35/482*  (2006.01)
*C23C 4/11*  (2016.01)
(Continued)

(52) U.S. Cl.
CPC .............. *C04B 35/482* (2013.01); *B05D 5/00* (2013.01); *C01G 25/02* (2013.01); *C04B 35/48* (2013.01);
(Continued)

(58) Field of Classification Search
CPC ..... C04B 35/106; C04B 35/109; C04B 35/48; C04B 35/482; C04B 35/488; B32B 15/04; C23C 4/10; C23C 28/04; B05D 5/00
See application file for complete search history.

(56) References Cited

U.S. PATENT DOCUMENTS 4,900,492 A * 2/1990 Claussen ............... C04B 35/488
264/662
5,008,221 A * 4/1991 Ketcham ............... C04B 35/803
501/103
(Continued)

FOREIGN PATENT DOCUMENTS

CN         1675396 A       9/2005
CN       101081735 A     12/2007
(Continued)

OTHER PUBLICATIONS

Yanli et al "Influence of Gd2O3 and Yb2O3 co-doping on phase stability. thermo-physical properties and sintering of 8YSZ", Chinese Journal of Aeronautics 25 (2012) 948-953.*
(Continued)

*Primary Examiner* — Mark Kopec
(74) *Attorney, Agent, or Firm* — Buchanan Ingersoll & Rooney P.C.

(57) ABSTRACT

The present invention relates to zirconium oxide powder for thermal spraying and a method for its manufacture. Furthermore, the present invention relates to thermal insulation layers, which are obtained using the zirconium oxide powder according to the invention.

19 Claims, 2 Drawing Sheets

(51) Int. Cl.
  *B05D 5/00* (2006.01)
  *C23C 4/134* (2016.01)
  *C04B 35/622* (2006.01)
  *C04B 35/64* (2006.01)
  *C04B 35/48* (2006.01)
  *C01G 25/02* (2006.01)
  *F01D 5/28* (2006.01)

(52) U.S. Cl.
  CPC ........ *C04B 35/62222* (2013.01); *C04B 35/64* (2013.01); *C23C 4/11* (2016.01); *C23C 4/134* (2016.01); *C04B 2235/3224* (2013.01); *C04B 2235/3225* (2013.01); *C04B 2235/3246* (2013.01); *C04B 2235/5427* (2013.01); *C04B 2235/9607* (2013.01); *F01D 5/288* (2013.01); *F05D 2220/30* (2013.01); *F05D 2230/90* (2013.01)

(56) References Cited

U.S. PATENT DOCUMENTS

| | | | |
|---|---|---|---|
| 6,812,176 | B1 | 11/2004 | Zhu et al. |
| 6,890,668 | B2 | 5/2005 | Bruce et al. |
| 7,041,383 | B2 | 5/2006 | Liu et al. |
| 7,700,508 | B1* | 4/2010 | Zhu ............ C23C 4/11 501/103 |
| 2004/0033884 | A1 | 2/2004 | Wallar |
| 2004/0043244 | A1* | 3/2004 | Bruce ............ C23C 30/005 428/632 |
| 2005/0026770 | A1 | 2/2005 | Zhu et al. |
| 2006/0078750 | A1 | 4/2006 | Zhu et al. |
| 2007/0082131 | A1 | 4/2007 | Doesburg et al. |
| 2014/0178632 | A1 | 6/2014 | Taylor et al. |
| 2016/0214903 | A1* | 7/2016 | Humpal ............ E06B 3/66304 |

FOREIGN PATENT DOCUMENTS

| | | | |
|---|---|---|---|
| CN | 103304234 | A * | 9/2013 |
| EP | 1400611 | A1 | 3/2004 |
| WO | 2008026901 | A1 | 3/2008 |
| WO | 2014204480 | A1 | 12/2014 |

OTHER PUBLICATIONS

Li et al "Synthesis and phase stability of scandia, gadolinia, and ytterbia co-doped zirconia for thermal barrier coating application", Journal of Thermal Spray Technology 136—vol. 24(1-2) Jan. 2015.*

Guo et al "Improvement on the phase stability, mechanical properties and thermal insulation of Y2O3-stabilized ZrO2 by Gd2O3 and Yb2O3 co-doping", Ceramics International 39 (2013) 9009-9015.*

International Search Report (PCT/ISA/210) dated Aug. 1, 2018, by the European Patent Office as the International Searching Authority for International Application No. PCT/EP2018/066562.

Written Opinion (PCT/ISA/237) dated Aug. 1, 2018, by the European Patent Office as the International Searching Authority for International Application No. PCT/EP2018/066562.

Office Action (Text of the First office Action) dated Aug. 17, 2021, by the Chinese Patent Office in corresponding Chinese Patent Application No. 201880041475.1, and an English Translation of the Office Action. (15 pages).

* cited by examiner

ZIRCONIUM OXIDE POWDER FOR THERMAL SPRAYING

The present invention relates to zirconium oxide powder for thermal spraying and a method for its manufacture. Furthermore, the present invention relates to thermal insulation layers that are obtained using the zirconium oxide powder according to the invention.

BACKGROUND TO THE INVENTION AND PRIOR ART

The use of zirconium oxide powders in the manufacture of thermal insulation layers has a long tradition. To achieve higher efficiencies, however, it is necessary to increase the process temperatures in stationary turbines, for example when generating power, or in flying turbines, for example in aviation, as far as possible. However, since essential components in the high-temperature part of the turbine such as blades, guide vanes and combustion chambers, for example, consist of metal materials, the combustion temperature cannot be set arbitrarily high. In these cases, thermal insulation layers are used as protection for the components affected. A common material nowadays for the thermal insulation of such metal components is zirconium oxide stabilised with yttrium oxide, in particular containing 6-9 percent by weight of yttrium oxide (often also termed "7YSZ", "7.5YSZ" or "8YSZ"), described below as "8YSZ".

To fulfil its task as a protective layer, a thermal insulation layer should be distinguished by a lowest possible thermal conductivity. According to the literature, the thermal conductivity of a zirconium oxide stabilised by yttrium oxide in monocrystalline form is approximately 2.1 to 2.9 W/mK. This indication of so-called intrinsic thermal conductivity refers to the material in dense and fault-free form. In practice, however, values of between 1 and 2 W/mK are typically measured in thermal insulation layers of 8YSZ, as the material is applied to the turbine components in the form of coatings. These coatings contain numerous disturbances that disrupt the heat flow and thus reduce the thermal conductivity compared with the intrinsic thermal conductivity. These disturbances are for example non-coherent boundary surfaces between the so-called "splats" in spray layers, amorphous states, grain boundaries, pores, dislocations or cracks. The insulation effect of the thermal insulation layer is thus determined not only by the intrinsic thermal conductivity of the sprayed material but predominantly by the mode of generation (e.g. plasma spraying of powders or suspensions, or EB-PVD [electron beam physical vapour deposition]). The nature of the spray powder used plays another crucial role here. Both determine the disturbances in thermal insulation layers, and the effect that the insulation effect is higher by a certain factor than that ascribable to a monocrystal.

Thermal insulation layers are particularly disrupted when they are not manufactured by melting and depositing a powder, but rather are deposited at least partially by condensation from the gas phase. Examples are the so-called EB-PVD method which starts out from sintered targets or the Cham Pro method which evaporates powder by means of plasma, or particular forms of suspension plasma spraying. All methods are very complex in terms of equipment and are characterised by low productivity or deposition rates. The thermal conductivity of such flawed coatings of 8YSZ can be below 1 W/mK.

For reasons of practical handling, the less elaborate and more productive method of plasma spraying of powders is often preferred. The layers obtained in this way are less disrupted, however, therefore the intrinsic thermal conductivity of the thermal insulation material has a stronger effect here. Depending on the disturbance of the layer, for example due to porosity, typical values of 1.2 to 2.2 W/mK for thermal conductivity are thus attained with 8YSZ.

A number of materials are suggested in the literature for improving thermal insulation compared with conventional 8YSZ. The discrete compounds such as pyrochlores, perovskites, alum inates and zirconates are characterised by very low intrinsic thermal conductivity but lose amounts of oxide constituents due to evaporation that cannot be controlled during plasma spraying, so that in the case of compounds containing zirconium oxide, unstabilised zirconium oxide can arise that can lead in turn to cracks in the coating on account of the phase transformation occurring and the associated change in volume. They are also comparatively brittle and produce coatings that therefore have comparatively poor thermal cycling behaviour.

An alternative are the so-called "solid solutions" based on zirconium oxide with one or more stabilising oxides such as yttrium and/or one or more rare earth oxides. Since the range of existence of a solid solution in regard to the content of stabilising oxide is naturally very wide and these are present in the case of zirconium oxides stabilised with high concentrations of stabilising oxides from high temperatures down to room temperature in the so-called defect fluorite structure, thermal cyclisation and loss of stabilising oxides during plasma spraying have virtually no effect, since no new phases are formed, in particular no unstabilised and thus transformable zirconium oxide. Examples of this material concept are described for example in U.S. Pat. Nos. 6,812, 176, 6,890,668 B2, 7,041,383 B2, and EP 1 400 611.

However, what is common to all the aforesaid materials is that the thermal conductivities mentioned relate to layers that are not characterised in more detail or to EB-PVD layers, so that the degree of the disturbances and thus the intrinsic thermal conductivity of the solid solutions cannot be assessed at all.

A disadvantage of the known solid solution materials is the high content of yttrium oxide. Due to its low molecular weight, it vaporises more easily during plasma spraying than e.g. lanthanum or rare earth oxides. In addition, it reacts more easily with silicates, as a result of which the thermal insulation layers lose stabiliser at high temperatures and become capable of transformation. The phenomenon is known as "CMAS corrosion". $Y_2O_3$ does not therefore represent a suitable loss reserve of stabilisation oxide in relation to both phenomena, as the material can become capable of transformation during plasma spraying or later in use.

U.S. Pat. No. 6,890,668 therefore limits the $Y_2O_3$ content to 5 percent by weight, but works with a high level of rare earth stabiliser oxides, which is disadvantageous for the strength and thus the thermocyclability of the layer.

It should also be stated in summary that all known and new thermal insulation layer materials present as a solid solution as an alternative to 8YSZ layers are either known only as EB-PVD layers, so that their intrinsic thermal conductivity cannot be assessed reliably, or they either have a high $Y_2O_3$ content or contain very high proportions of rare earth oxides.

Another disadvantage of very strongly disturbed thermal insulation layers such as EB-PVD layers is the fact that the disturbances are of very small dimensions, therefore represent a high driving force for sintering processes, and can thus heal at high temperatures, due to which the thermal conductivity increases again. They thus represent a driving force for sintering, so that sintering shrinkage occurs, and spalling of the thermal insulation layer may subsequently occur.

Plasma-sprayed layers are therefore a better alternative as they have fewer disturbances and cause less sintering activity on account of the size of their disturbances.

There is therefore a need for a spray powder based on zirconium oxide which permits the manufacture of thermal insulation layers with a low thermal conductivity on the one hand and overcomes the disadvantages of the prior art on the other hand.

US 2006/0078750 discloses a composition for the production of thermal barrier layers which has a base oxide, a primary stabiliser and at least two additional cationic oxides as dopants.

WO 2014/204480 describes barrier layers that can be applied to ceramic substrates such as SiC/SiC composite systems and have a silicon/silicide compound, an oxide/silicate compound, or a combination thereof.

US 2005/0026770 relates to a composition for manufacturing a thermal barrier layer which contains 46-97 mole percent of a base oxide, 2-25 mole percent of a primary stabiliser, 0.5-25 mole percent of a dopant from group A and 0.5-25 mole percent of a dopant from group B, wherein the base oxide is selected from $ZrO_2$, $HfO_2$ and mixtures thereof, the primary stabiliser is selected from $Y_2O_3$, $Dy_2O_3$, $Er_2O_3$ and mixtures thereof, group B consists of $Nd_2O_3$, $Sm_2O_3$, $Gd_2O_3$, $Eu_2O_3$ and mixtures thereof, and group A consists of rare earth oxides, alkaline earth metal oxides, transition metal oxides and mixtures thereof.

DISCLOSURE OF THE INVENTION

Figure 1:
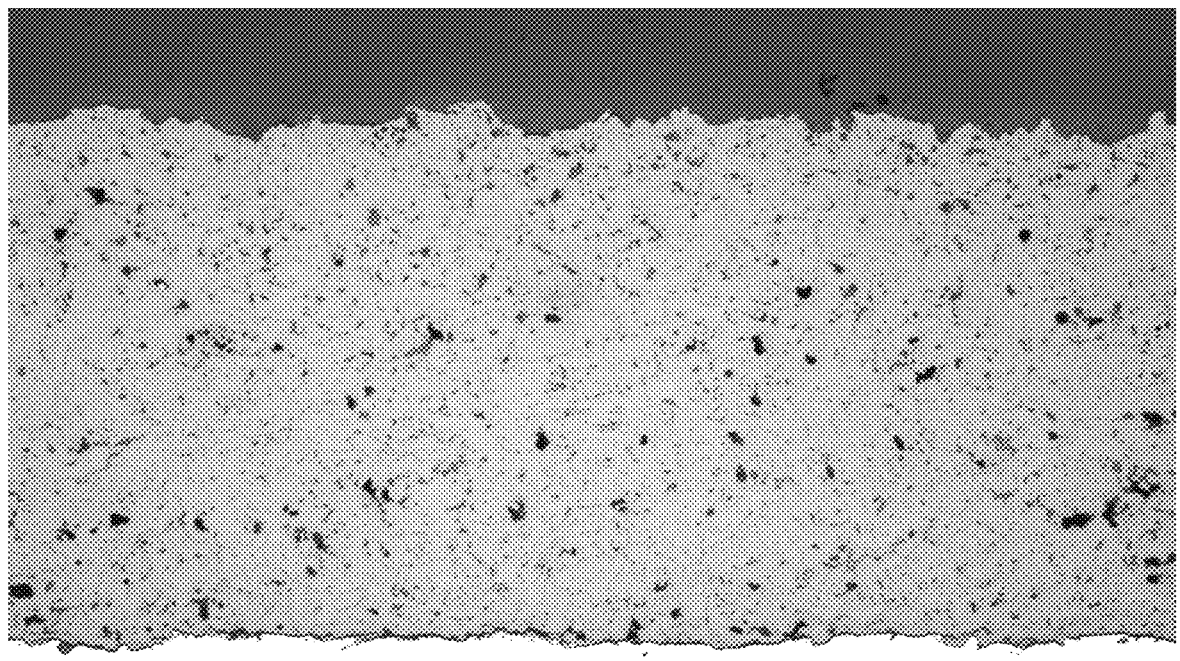
FIG. 1 shows that the spray layer has the typical structure of a spray layer of agglomerated/sintered spray powders.

The object of the present invention therefore consists in providing a thermal spray powder which can be applied by means of plasma spraying and from which thermal insulation layers can be produced which have low thermal conductivity and are particularly suitable for coating metal components in high-temperature applications.

The object is achieved by a zirconium oxide powder as described in the claims and also below. The zirconium oxide powder according to the invention can also be regarded in particular as a spray powder for thermal spraying on a zirconium oxide basis or zirconium oxide powder basis. A preferred subject matter of the present invention is therefore a spray powder based on zirconium oxide.

It was surprisingly found that the $Y_2O_3$ content required for stabilising the zirconium oxide can be further reduced if $Y_2O_3$ is used in combination with other oxides, in particular rare earth oxides. In this way the aforesaid disadvantages can be avoided, in particular the loss of stabilising oxide and the associated transformation of the zirconium oxide.

A subject matter of the present invention is therefore a zirconium oxide powder ($ZrO_2$) for thermal spraying which comprises yttrium oxide ($Y_2O_3$), ytterbium oxide ($Yb_2O_3$) and gadolinium oxide ($Gd_2O_3$), wherein the content of yttrium oxide is 0.01 to 2.5 percent by weight relative to the total weight of the powder. The inventive zirconium oxide powder is preferably a stabilised zirconium oxide powder.

The powder according to the invention can be applied by means of plasma spraying and thus enables access to an efficient and economical production process unencumbered by the aforesaid disadvantages.

The zirconium oxide powder according to the invention can also be described as consisting of:
Yttrium oxide (Y2O3): 0.01 to 2.5 percent by weight,
Ytterbium oxide (Yb2O3): 5.0 to 20.0 percent by weight,
Gadolinium oxide (Gd2O3): 5.0 to 20.0 percent by weight,
optionally hafnium oxide (HfO2): 0.1 to 3 percent by weight,
optionally other components: 0.1 to 7.9 percent by weight,
and, as the remainder, zirconium oxide ($ZrO_2$) and unavoidable impurities, each relative to the total weight of the powder. It is evident from this presentation that the powder according to the invention is a spray powder on a zirconium oxide basis or zirconium oxide powder basis that contains a number of functional constituents.

In a preferred embodiment of the present invention, the proportion of yttrium oxide is 0.1 to 2.4 percent by weight, preferably 0.5 to 2.0 percent by weight, particularly preferably 0.7 to 1.5 percent by weight, each relative to the total weight of the powder. It has surprisingly been shown that, in spite of the small proportion of yttrium oxide, the stabilisation of the zirconium oxide in the tetragonal phase can be maintained even at high temperatures. In particular, the content of yttrium oxide is from 0.1 percent by weight, preferably from 0.5 percent by weight, more preferably from 0.7 percent by weight up to 2.4 percent by weight, preferably up to 2.0 percent by weight and more preferably up to 1.5 percent by weight, in each case relative to the total weight of the powder. In the context of the present invention, all the stated lower and upper limits can be combined with one another in any way. Combinations of different upper or lower limits with one another can also define content ranges according to the invention.

With regard to the improvement of the intrinsic thermal conductivity, it has proved advantageous if the lattice structure of the host lattice $ZrO_2$ is expanded locally as differently as possible. An embodiment is therefore preferred in which the ytterbium oxide content is in the range from 5.0 to 20.0 percent by weight, preferably 6.0 to 15.0 percent by weight and particularly preferably 7.0 to 13.0 percent by weight relative in each case to the total weight of the powder. In particular, the content of ytterbium oxide is from 5.0 percent by weight, preferably from 6.0 percent by weight, more preferably from 7.0 percent by weight up to 20 percent by weight, preferably up to 15.0 percent by weight and more preferably up to 13.0 percent by weight, in each case relative to the total weight of the powder. In the context of the present invention, all the stated lower and upper limits can be combined with one another in any way. Combinations of different upper or lower limits with one another can also define content ranges according to the invention.

In a further preferred embodiment, the proportion of gadolinium oxide in the powder is 5.0 to 20.0 percent by weight, preferably 6.0 to 15.0 percent by weight and particularly preferably 7.0 to 13.0 percent by weight, in each case relative to the total weight of the powder. In particular, the content of gadolinium oxide is from 5.0 percent by weight, preferably from 6.0 percent by weight, more preferably from 7.0 percent by weight up to 20 percent by weight, preferably up to 15.0 percent by weight and more preferably up to 13.0 percent by weight, in each case relative to the total weight of the powder. In the context of the present invention, all the stated lower and upper limits can be combined with one another in any way. Combinations of different upper or lower limits with one another can also define content ranges according to the invention.

An embodiment of the powder according to the invention is particularly preferred in which the powder contains 1.0 to 2.0 percent by weight of yttrium oxide, 8.0 to 12.0 percent by weight of ytterbium oxide and 8.0 to 12.0 percent by weight of gadolinium oxide, in each case relative to the total weight of the powder. It was surprisingly found that with proportions of the oxides in the specified ranges, a thermal insulation layer manufactured from such a powder has particularly advantageous properties, in particular with regard to thermal conductivity.

The powder according to the invention can have hafnium oxide ($HfO_2$) as another component. The ratio of $ZrO_2$ to $HfO_2$ in the powder is preferably between 99:1 and 95:5 parts by weight. The quantity of hafnium oxide in this case is preferably 0.1 to 3 percent by weight, particularly preferably 0.5 to 2.0 percent by weight, in each case relative to the total weight of the powder. Compared with zirconium, hafnium has a higher atomic mass, which can have the effect at a given temperature of a lower excitation of the lattice vibrations, which may further reduce the Cp value and thus the thermal conductivity compared with a lattice consisting only of zirconium ions. In particular, the content of hafnium oxide is from 0.1 percent by weight, and preferably from 0.5 percent by weight to 3 percent by weight, and preferably to 2.0 percent by weight, in each case relative to the total weight of the powder. In the context of the present invention, all the stated lower and upper limits can be combined with one another in any way. Combinations of different upper or lower limits with one another can also define content ranges according to the invention.

In a preferred embodiment, the zirconium oxide powder according to the invention comprises further components, wherein their content is preferably in the range from 0.1 to 7.9, preferably to 7.0 percent by weight, preferably 0.2 to 7.0 percent by weight, more preferably 0.2 to 4.5 percent by weight, particularly preferably 0.3 to 2.5 percent by weight, each relative to the total weight of the powder. The other components individually or in total are advantageously present in contents of 0.1 percent by weight to 7.9 percent by weight, preferably to 7.0 percent by weight, more preferably to 4.5 percent by weight and even more preferably to 2.5 percent by weight, each relative to the total weight of the powder.

The further components can be used to influence the properties of the powder according to the invention, or the properties of the thermal insulation layers obtained from this powder. For example, the spraying properties can be adapted to the required conditions by adding further components. Accordingly, an embodiment is preferred in which the further components are selected from the group consisting of silicon compounds, in particular $SiO_2$ and silicates, aluminium compounds, in particular aluminium oxide ($Al_2O_3$), further oxides apart from yttrium oxide, ytterbium oxide, gadolinium oxide and hafnium oxide, in particular alkaline earth oxides, lanthanum oxide ($La_2O_3$), iron oxide, titanium dioxide, alkali metal oxides, oxides of radioactive elements, in particular uranium oxide ($U_2O_3$) and thorium oxide ($ThO_2$), chlorides and organic compounds and mixtures thereof.

Due to the health risk from radioactive radiation, the proportion of radioactive elements and compounds such as uranium oxide or thorium oxide should be kept as low as possible. The content of radioactive elements and compounds in the powder is therefore preferably less than 0.1 percent by weight, relative to the total weight of the powder.

In order to control the sintering behaviour of the thermal insulation layer, compounds can be added to the powder according to the invention that form foreign phases in the powder or in the subsequent coating. Examples of such compounds are in particular silicates, silicon oxides and aluminium oxide. An embodiment is therefore preferred in which the powder according to the invention has 0.001 to 0.5 percent by weight or less, preferably 0.01 to 0.1 percent by weight, of silicon and/or aluminium compounds, in each case relative to the total weight of the powder. The content of silicon and/or aluminium compounds is from 0.001 percent by weight and preferably from 0.01 percent by weight to 0.5 percent by weight and preferably to 0.1 percent by weight, relative in each case to the total weight of the powder.

As well as yttrium oxide, ytterbium oxide and gadolinium oxide, the powder according to the invention can comprise other oxides. These oxides can contribute to the further stabilisation of the zirconium oxide and expand or further disrupt its lattice structure. Examples of such oxides are alkaline earth oxides, rare earth oxides other than those already mentioned, but also compounds such as lanthanum oxide or iron oxide ($Fe_2O_3$). In one preferred embodiment, the content of other oxides is up to 2.0 percent by weight, preferably up to 1.0 percent by weight, and particularly preferably 0.001 to 0.5 percent by weight, in each case relative to the total weight of the powder.

Furthermore, the powder according to the invention can contain other constituents, for example volatile compounds such as organic compounds or chlorides. These can be added to the powder, for example to improve the attainable porosity of the thermal insulation layer. The content of such compounds, in particular the content of organic compounds and/or chlorides, is preferably up to 4.0 percent by weight, preferably up to 2.0 percent by weight, and particularly preferably 0.001 to 1.0 percent by weight, each relative to the total weight of the powder.

The zirconium oxide powder according to the invention manifests high stability over a wide temperature range. No transformation was observed at room temperature or at high temperatures. It has surprisingly been shown that this stability occurs in particular when the zirconium oxide is present in the defect fluorite structure. An embodiment is therefore preferred in which the zirconium oxide is in the defect fluorite structure. It is further preferred that the zirconium oxide is present in the zirconium oxide powder according to the invention as a ceramic mixed crystal.

Another parameter that influences the spray properties of the powder in particular is its particle size. The selection of the particle size is geared to the requirements of the plasma spraying process and the spraying systems used, and to the required structure of the plasma spray layer, in particular the faults. Fine particle sizes are generally used to produce dense or less porous layers, especially for layers with vertical cracks. Coarser particle sizes are used in particular to create layers with high porosities. The nominal particle size or grain size distribution is defined in accordance with EN 1274 and DIN EN 1274:2005-02, wherein limits of the fractions of the particle size distribution up to and including 38 µm are determined by sieving processes, below this limit usually by laser diffraction or microsieving.

In a preferred embodiment, the spray powder according to the invention has a nominal particle size or grain size distribution of 22/5 μm to 300/75 μm, as defined in Section 3.3 of DIN EN 1274:2005-02. It was surprisingly found that powders with a particle size in the range specified are particularly suitable for plasma spraying and result in particularly resistant coatings, which are also distinguished by an advantageous thermal conductivity.

Zirconium oxide can exist in different crystal phases which differ in their properties, in particular in their volume. Which crystal phase is present depends, among other things, on the temperature and the quantity and distribution quality of stabilising oxide with which the zirconium oxide is stabilised. For high-temperature applications, it has proved to be advantageous if the proportion of zirconium oxide that is present in the monoclinic phase is as small as possible. However, the problem exists here that the zirconium oxide is not stable in other phases, especially at room temperature. Since the powder is exposed to a constantly changing temperature cycle as a thermal insulation layer, it is a challenge to maintain stability. The zirconium oxide powder of the present invention is characterised by its stability over a wide temperature range. In a preferred embodiment, the proportion of zirconium oxide in the monoclinic phase at room temperature is therefore less than 4.0 percent by volume, preferably less than 2.0 percent by volume and particularly preferably less than 1.0 percent by volume, in each case relative to the total volume of the powder. The proportion of the crystal phases can be determined by means of X-ray diffraction.

Another important criterion of a spray powder is its morphology. It has proved particularly advantageous in this case when the powder consists of hollow spheres. These burst when they strike the surface to be coated and form so-called "splats", resulting among other things in a low roughness of the coating. An embodiment is therefore preferred in which the zirconium oxide powder according to the invention is present at least partially in the form of hollow spheres. The proportion of hollow spheres is particularly preferably at least 50% by number, preferably 75% by number, particularly preferably 90% by number relative to the total number of powder particles. The morphology of the powder can be determined, for example, by means of powder embedding in a resin mass and subsequent metallographic preparation.

To be able to be used as a spray powder, powders must have certain properties that are specified in the spray powder standard EN 1274. Powders which are agglomerated and sintered are particularly suitable. An embodiment of the present invention is preferred, therefore, in which the zirconium oxide is of the agglomerated sintered type.

Further subject matter of the present invention is a method for manufacturing the zirconium oxide powder according to the invention. The method comprises the following steps:
a) provision of the starting materials comprising zirconium oxide, yttrium oxide, ytterbium oxide and gadolinium oxide, wherein the content of yttrium oxide is 0.01 to 2.5 percent by weight, relative to the total weight of the starting materials;
b) high-temperature treatment of the starting materials from step a) to obtain a stabilised zirconium oxide powder; and
c) cooling of the powder obtained in step b).

In a preferred embodiment, the high-temperature treatment in step b) is selected such that, at room temperature and after prolonged storage, no further monoclinic, i.e. unstabilised zirconium oxide, can be detected by means of X-ray diffraction. It is thus ensured that the diffusion or mixing of the stabilising oxides with the zirconium oxide has largely taken place.

The high-temperature treatment is preferably melting, e.g. by means of an electrosmelting furnace, plasma spheroidisation (melting in flight) or diffusion sintering as a solid-phase reaction between 1200 and 2500° C.

Also preferred is an embodiment of the method according to the invention in which the cooling in step c) is such that the zirconium oxide powder is present in the defect fluorite structure at room temperature.

In a preferred embodiment, the method can further comprise an agglomeration step in which the powder from step b) is agglomerated. This method step is preferably carried out after step a) and before step b). Alternatively, the agglomeration can also be carried out as an additional step after step c).

The zirconium oxide powder according to the invention is outstandingly suitable for the production of thermal insulation layers, in particular for metal components in high-temperature applications. Further subject matter of this invention is therefore a thermal insulation layer that can be or is obtained using the zirconium oxide powder according to the invention. In the context of the present invention, a thermal insulation layer is thus provided that is produced by thermal spraying of the zirconium oxide powder described above, or of spray powder based on zirconium oxide.

The basic property of thermal insulation layers is their insulating effect against the ambient temperature. This insulation effect is described by the thermal conductivity of the thermal insulation layer, which should be as low as possible in order to avoid heat transportation through the layer to the coated component. The thermal insulation layer according to the invention is characterised in particular by its low thermal conductivity, which is significantly below that of the prior art in spite of the plasma spraying process used. The thermal insulation layer of the present invention preferably has a thermal conductivity of 1.6 W/mK or less, measured at 1200° C. Thermal conductivity can be determined using conventional devices such as heat flow meters and calorimeters, or according to the laser flash method.

Another parameter that characterises the insulation effect of a thermal insulation layer is porosity. The thermal insulation layer according to the invention is characterised in that its porosity is selected such that maximum thermal insulation takes place. The thermal insulation layer according to the invention preferably has a porosity in the range from 2 to 30 area percent, preferably 5 to 20 area percent. The porosity of a coating can be determined, for example, by means of sanding and image evaluation, producing a result in area percent.

It has surprisingly been shown that the loss of stabilising oxides, for example by evaporation, can be remedied by the fact that the powder is present in the form of a so-called "solid solution". An example of a "solid solution" are mixed crystals that consist of different chemical elements, wherein the foreign atoms or ions are statistically distributed. These can either be embedded in the interstitial sites of the host lattice or replace an atom of the other element by substitution. Solid solutions that have metallic properties are also termed alloys.

To achieve the high stability over a wide temperature range by which the thermal insulation layer according to the invention is characterised, it has proved advantageous if the zirconium oxide powder used for production is present as a "solid solution". A preferred embodiment of the thermal insulation layer according to the invention is therefore characterised in that the zirconium oxide powder is present in the thermal insulation layer as a "solid solution".

The thermal insulation layer according to the invention is characterised by its low thermal conductivity and high resistance even over a large temperature range. This is therefore particularly suitable for high-temperature applications. The thermal insulation layer is therefore preferably used for coating high-temperature components, in particular turbines, which operate at high temperatures as they come into contact with the hot combustion gases, thus in particular turbine blades, guide vanes of turbines and combustion chambers of turbines.

The zirconium oxide powders according to the invention are particularly suitable as thermal insulation layers for high-temperature components. Further subject matter of the present invention is therefore the use of the zirconium oxide powder according to the invention, or the inventive thermal insulation layer described above for coating high-temperature components.

Further subject matter of the present invention is a method for manufacturing the thermal insulation layer according to the invention, wherein the thermal insulation layer is manufactured by means of a thermal spraying process and preferably by use of the inventive zirconium oxide powder described above. The thermal spraying process is particularly preferably plasma spraying.

EXEMPLARY EMBODIMENTS

The present invention will be illustrated by means of the following examples, wherein these should not be understood as limiting the inventive concept, i.e. as restrictive.

Example 1 (Comparative Example)

An 8YSZ plasma spray powder with a nominal particle size or grain size distribution according to DIN EN 1274:2005-02 of 90/10 μm was produced by the method "agglomeration/sintering" of the individual oxides $Y_2O_3$ and $HfO_2$-containing $ZrO_2$. According to chemical and physical analysis, this powder had the following properties:

$Y_2O_3$ 7.68%, $HfO_2$ 1.91%
MgO 13 ppm, CaO 330 ppm, $Fe_2O_3$ 130 ppm, $Al_2O_3$ 1200 ppm, $SiO_2$ 1150 ppm
$U_2O_3+ThO_2$ 530 ppm
Sieve analysis (percentages by weight):

| >106 μm | 0% |
| 106/75 μm | 11.7% |
| 75/45 μm | 49.1% |
| <45 μm | 39.2 |

Grain distribution parameters using laser diffraction (Microtrac X100):
D90: 92 μm, D50 55 μm, D10 26 μm
Proportion of monoclinic phase: <1 vol %

The plasma spray powder was processed with a plasma spray system "F4" using the following setting:
Argon 35 l/min, hydrogen 10 l/min, electrical power 35 kW
Conveying gas 3 l/min, conveying 80 g/min
Nozzle: 8 mm, spray distance 120 mm A porosity of 7% (area percent) was determined on the spray layer by means of image processing. FIG. 1 shows that the spray layer has the typical structure of a spray layer of agglomerated/sintered spray powders.

The thermal conductivity in the spray layer was determined by means of the laser flash method at temperatures from room temperature up to 1200° C. The results are shown in Table 1.

Example 2 (According to the Invention)

A plasma spray powder with a nominal particle size or grain size distribution according to DIN EN 1274:2005-02 of 125/45 μm was produced by the method "agglomeration/sintering" of the individual oxides $Y_2O_3$, $Yb_2O_3$, $Gd_2O_3$ and $HfO_2$-containing $ZrO_2$. According to chemical and physical analysis, this powder had the following properties:

$Y_2O_3$ 1.64%, $Yb_2O_3$ 10.19%, $Gd_2O_3$ 10.10%, $HfO_2$ 1.64%
MgO, CaO, $Fe_2O_3$, $Al_2O_3$, $SiO_2$ each <0.0100%
$U_2O_3+ThO_2$<100 ppm
Remainder $ZrO_2$
Sieve analysis:

| >125 μm | 0.8% |
| 125/106 μm | 7.1% |
| 106/90 μm | 13.8% |
| 90/53 μm | 100% remainder |
| 53/45 μm | 14.1% |
| <45 μm | 3.6% |

Grain distribution parameters by means of laser diffraction (Microtrac X100):
D90: 109 μm, D50 73 μm, D10 51 μm
Proportion of monoclinic phase: <1 vol %

Figure 2:
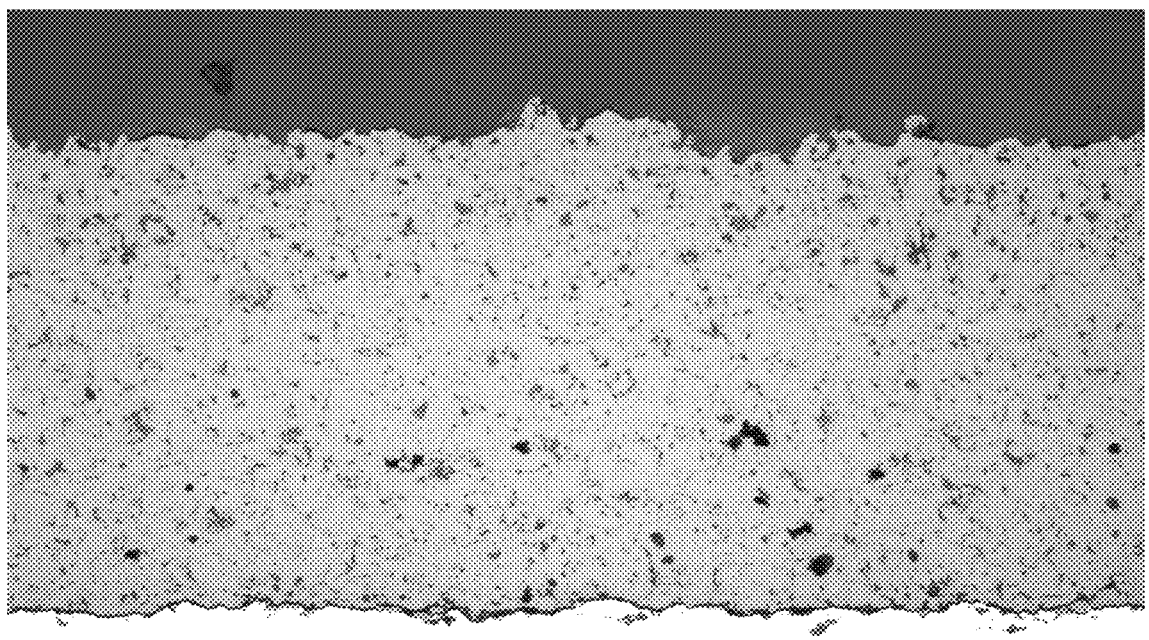
FIG. 2 shows that the spray layer also has the typical structure of a spray layer made of agglomerated/sintered spray powders.

The plasma spray powder was processed with a plasma spray system "F4" using the following setting:
Argon 35 l/min, hydrogen 10 l/min, electrical power 35 kW
Conveying gas 3 l/min, conveying 80 g/min
Nozzle: 8 mm, spray distance 120 mm A porosity of 8+/−1% (area percent) was determined in the spray layer by means of image processing. FIG. 2 shows that the spray layer also has the typical structure of a spray layer made of agglomerated/sintered spray powders.

The thermal conductivity at temperatures from room temperature up to 1200° C. was determined in the spray layers from examples 1 and 2 by means of the laser flash method. The results are shown in Table 1. A reduction in the thermal conductivity of between 7.7% (1200° C.) and 16.5% (500° C.) compared with the reference layer from Example 1 is achieved depending on the measuring temperature.

TABLE 1

| Temperature ° C. | Example 1 (comparison) Thermal conductivity [W/mK] | Example 2 Thermal conductivity [W/mK] |
| --- | --- | --- |
| 25 | 1.344 | 1.124 |
| 100 | 1.288 | 1.093 |
| 200 | 1.232 | 1.061 |
| 300 | 1.193 | 1.037 |
| 400 | 1.109 | 0.947 |
| 500 | 1.104 | 0.922 |
| 600 | 1.112 | 0.959 |
| 700 | 1.115 | 0.984 |
| 800 | 1.174 | 1.050 |
| 900 | 1.256 | 1.138 |
| 1000 | 1.416 | 1.251 |
| 1100 | 1.633 | 1.483 |
| 1200 | 1.726 | 1.594 |

As can be seen from Table 1, the thermal insulation layer produced from the powder according to the invention has a significantly reduced thermal conductivity compared with the layer produced from the comparison powder. The reduced thermal conductivity is particularly evident at higher temperatures, which has a positive effect particularly in applications in the high-temperature range.

Since the zirconium oxide powders in Examples 1 and 2 have different compositions and thus different melting behaviour, the particle size of the powder 1 was deliberately chosen to be smaller in order to compensate for the lower degree of melting and the resulting higher layer porosity of powder 1 by way of a finer particle size. As can be seen from the measured values for porosity, this has also succeeded, due to which the measured values for the thermal conductivity of the resulting coatings only permit conclusions to be drawn about the intrinsic thermal conductivity of the coating materials.

The invention claimed is:

1. Zirconium oxide powder ($ZrO_2$) for thermal spraying comprising yttrium oxide ($Y_2O_3$), ytterbium oxide ($Yb_2O_3$) and gadolinium oxide ($Gd_2O_3$), wherein the content of yttrium oxide is 0.01 to 2.5 percent by weight relative to the total weight of the powder, and hafnium oxide ($HfO_2$) up to 3 percent by weight.

2. Zirconium oxide powder according to claim 1, consisting of, in each case relative to the total weight of the powder:
   yttrium oxide ($Y_2O_3$): 0.01 to 2.5 percent by weight,
   ytterbium oxide ($Yb_2O_3$): 5.0 to 20.0 percent by weight,
   gadolinium oxide ($Gd_2O_3$): 5.0 to 20.0 percent by weight,
   hafnium oxide ($HfO_2$): 0.1 to 3 percent by weight,
   optionally other components: 0.1 to 7.9 percent by weight,
   and as the rest zirconium oxide ($ZrO_2$) and unavoidable impurities.

3. Zirconium oxide powder according to claim 1, wherein the content of yttrium oxide is 0.1 to 2.4 percent by weight relative to the total weight of the powder.

4. Zirconium oxide powder according to claim 1, wherein the content of ytterbium oxide is 5.0 to 20.0 percent by weight relative to the total weight of the powder.

5. Zirconium oxide powder according to claim 1, wherein the content of gadolinium oxide is 5.0 to 20.0 percent by weight relative to the total weight of the powder.

6. Zirconium oxide powder according to claim 1, wherein the powder contains 1.0 to 2.0 percent by weight yttrium oxide, 8.0 to 12.0 percent by weight ytterbium oxide, 8.0 to 12.0 percent by weight gadolinium oxide, and 0.1 to 3 percent by weight hafnium oxide.

7. Zirconium oxide powder according to claim 1, wherein the powder has other components in a quantity from 0.1 to 7.9 relative to the total weight of the powder.

8. Zirconium oxide powder according to claim 7, wherein the other components are selected from the group consisting of silicon compounds, aluminium compounds, alkaline earth oxides, lanthanum oxide ($La_2O_3$), iron oxide ($Fe_2O_3$), titanium dioxide, alkali metal oxides, oxides of radioactive elements, chlorides and organic compounds and mixtures thereof.

9. Zirconium oxide powder according to claim 7, wherein the other components in total are contained in quantities from 0.1 percent by weight to 7.0 percent by weight relative to the total weight of the powder.

10. Zirconium oxide powder according to claim 1, wherein the powder has a grainsize distribution of 22 μm/5 μm to 300 μm/75 μm, measured by sieving or laser diffraction, and determined according to EN 1274 and DIN EN 1274:2005-02.

11. Zirconium oxide powder according to claim 1, wherein the proportion of zirconium oxide in the monoclinic phase is less than 4.0 percent by weight relative to the total weight of the powder.

12. Zirconium oxide powder according to claim 1, comprising, in each case relative to the total weight of the powder:
    yttrium oxide ($Y_2O_3$): 0.01 to 2.5 percent by weight,
    ytterbium oxide ($Yb_2O_3$): 5.0 to 20.0 percent by weight,
    gadolinium oxide ($Gd_2O_3$): 5.0 to 20.0 percent by weight,
    hafnium oxide ($HfO_2$): up to 3 percent by weight.

13. Zirconium oxide powder according to claim 1, comprising, in each case relative to the total weight of the powder:
    yttrium oxide ($Y_2O_3$): 0.01 to 2.5 percent by weight,
    ytterbium oxide ($Yb_2O_3$): 5.0 to 20.0 percent by weight,
    gadolinium oxide ($Gd_2O_3$): 5.0 to 20.0 percent by weight,
    hafnium oxide ($HfO_2$): 0.1 to 3 percent by weight.

14. Method for manufacturing a zirconium oxide powder according to claim 1, comprising the following steps:
   a) providing starting materials comprising zirconium oxide, yttrium oxide, ytterbium oxide, gadolinium oxide, and hafnium oxide, wherein the content of yttrium oxide is 0.01 to 2.5 percent by weight relative to the total weight of the mixture;
   b) high-temperature treatment of the starting materials from step a) to obtain a stabilised zirconium oxide powder;
   c) cooling of the powder obtained in step b).

15. A method comprising coating the zirconium oxide powder according to claim 1 on high-temperature components.

16. Thermal insulation layer obtainable by using a zirconium oxide powder according to claim 1.

17. Thermal insulation layer according to claim 16, wherein the thermal insulation layer has a porosity of 2 to 30 area percent.

18. Thermal insulation layer according to claim 16 wherein it is a thermal insulation layer for turbine blades, guide vanes of turbines and combustion chambers of turbines.

19. Method for manufacturing a thermal insulation layer according to claim 16, wherein the thermal insulation layer is produced by means of a thermal spraying process.

* * * * *